United States Patent [19]

Fasano

[11] 4,371,756

[45] Feb. 1, 1983

[54] BRIDGE LIFTER MODULE

[75] Inventor: Michael C. Fasano, Syosset, N.Y.

[73] Assignee: Porta Systems Corp., Syosset, N.Y.

[21] Appl. No.: 238,924

[22] Filed: Feb. 27, 1981

[51] Int. Cl.³ .......................................... H04M 13/00
[52] U.S. Cl. ...................................................... 179/35
[58] Field of Search ................ 179/16 F, 17 R, 17 A, 179/30, 31, 18 F, 18 FA, 35, 98, 1 PC, 2 C

[56] References Cited

U.S. PATENT DOCUMENTS 4,237,346  12/1980  De Luca et al. ....................... 179/35

Primary Examiner—Thomas A. Robinson
Attorney, Agent, or Firm—Charles E. Temko

[57] ABSTRACT

An improved telephone circuit module incorporating a bridge lifter switching means which permits direct connection of party line subscriber circuits to a terminal block with the elimination of prior art saturable bridge lifters normally mounted upon a main distributing frame, and accompanying cable runs. The bridge lifter module comprises a solid state thick film circuit formed upon a ceramic substrate, suitably encapsulated, and is sufficiently small in overall size to fit within a connecting module which engages a part of a housing, and electrically conductive wire wrap terminals of certain types of known connector blocks.

2 Claims, 9 Drawing Figures

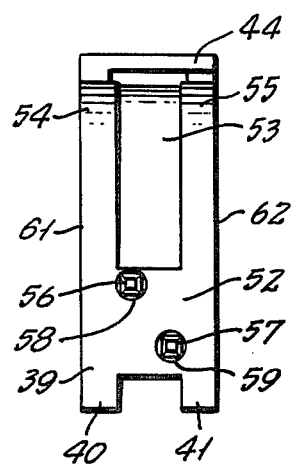
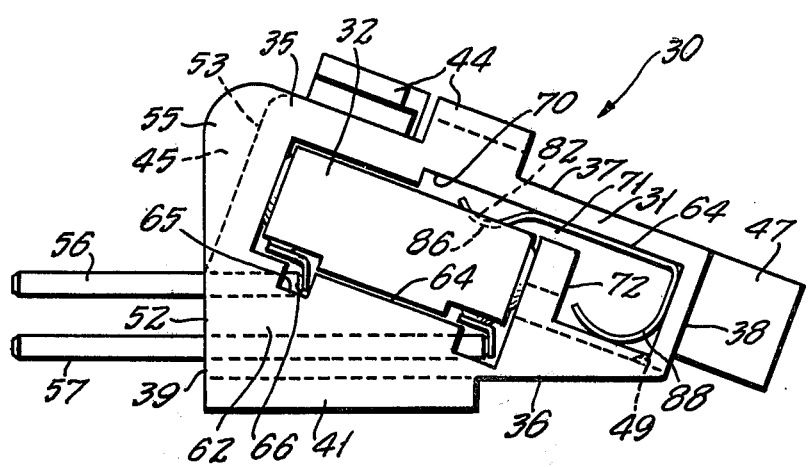
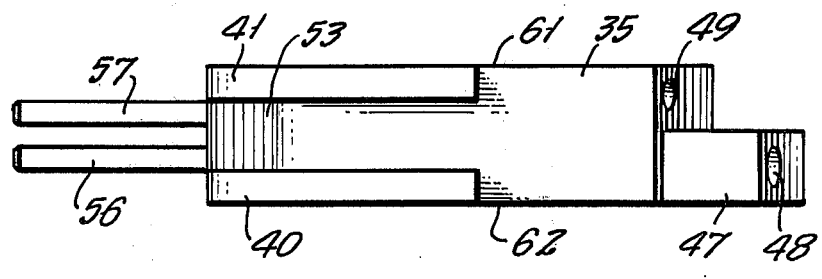
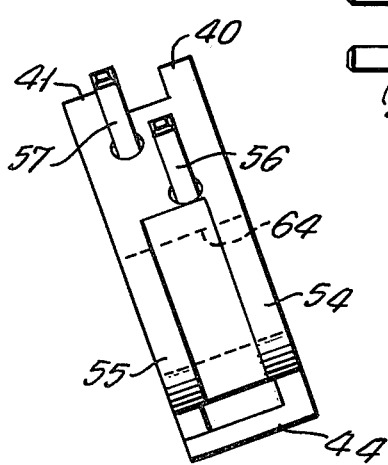
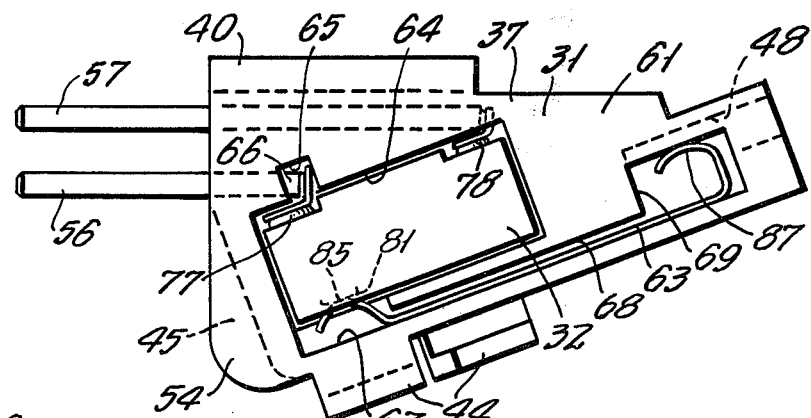

BRIDGE LIFTER MODULE

BACKGROUND OF THE INVENTION

This invention relates generally to the field of telephony, and more particularly to an improved form of telephone circuit module incorporating means for automatically switching bridged subscriber lines without the necessity of providing large tie jumpers and prior art saturable bridge lifter devices.

Although saddled with a degree of inconvenience from the standpoint of an individual subscriber, bridged subscriber circuits, commonly referred to as party lines, are still in wide use throughout the United States. In such connections, two or more individual subscriber lines share a common input and assigned telephone number, and where one of the bridged circuits is in use, the others are necessarily inoperative. In the traditional form of interconnection, several lines are connected from the connector block to a known saturation type bridge lifter which, in turn, connects the line in use to a terminal block and office switching equipment. The saturated type bridge lifter is a separate unit mounted upon the main distributing frame, and requires relatively long and costly cable runs when assembling the circuits on the main distributing frame. Apart from the cost of such devices, they occupy considerable space on the distributing frame, which might otherwise be more efficiently utilized.

As might be expected in the case of a long-standing problem, considerable progress has been made in the art. A solid state bridge lifter circuit has been developed of size sufficiently small to permit mounting within the housing of a plug type protector module used to protect an individual subscriber line against the effects of overload. With more modern type connector blocks utilizing plug type protector modules, reassignment of central office lines is simply a matter of replacing existing protector modules with protector modules incorporating the solid state bridge lifter circuit. The resulting advantages include the saving of frame space, simplified administration, and savings in installation costs.

Unfortunately, many older telephone offices, having older type frame and connector block installations, are unable to use the above-described structure for the reasons that the older style connector blocks employ protector devices which are not enclosed within a replaceable module. A typical example is the Western Electric Type C-50A or C-52A protector. The usual heat coil and carbon arc components are exposed and are mounted in operative position by resilient conductive spring blades having no means for accommodating the bridge lifting circuitry. In the recently issued U.S. Pat. No. 4,237,346 granted to Paul V. De Luca et al., and assigned to the same assignee as the instant application, there is disclosed a structure which solves this problem.

A somewhat similar problem is encountered in the case of telephone offices of somewhat newer vintage employing the Western Electric Type 300 which were widely installed during the 1950 decade. This type block is somewhat more self-contained than the Type C-50A, but does have exposed pairs of wire wrap terminals along one side which offer a location in which the bridge lifter module may be placed in series with a subscriber line at the terminal block.

SUMMARY OF THE INVENTION

Briefly stated, the invention contemplates the provision of an improved solid state bridge lifter module, particularly adapted and to be used in conjunction with blocks of the Western Electric Type 300 configuration to provide the simplicity and convenience heretofore available only to offices having more contemporary type connector blocks which employ plug-type protector modules. The inventive structure may be simply installed and removed, as required, and does not alter the function of existing subscriber circuit protection devices. The solid state circuit is encased within a synthetic resinous housing having resilient contact members adapted to be engaged by exposed wire wrap terminals on the block when the device is installed. The housing provides a pair of substitute wire wrap terminals in series with the originally engaged terminals upon which conductive wires may be installed. Means is provided whereby the housing is resiliently clamped to an available projection on the connector block.

BRIEF DESCRIPTION OF THE DRAWINGS

In the drawings, to which reference will be made in the specification, similar reference characters have been employed to designate corresponding parts throughout the several views.

FIG. 5 is a side elevational view of the embodiment in detached condition.

FIG. 6 is a side elevational view thereof showing the side opposite that seen in FIG. 5.

FIG. 7 is an end elevational view of the embodiment.

FIG. 8 is an elevational view thereof showing the end opposite that seen in FIG. 7.

FIG. 9 is a top plan view of the embodiment.

DETAILED DESCRIPTION OF THE DISCLOSED EMBODIMENT

Figure 1:
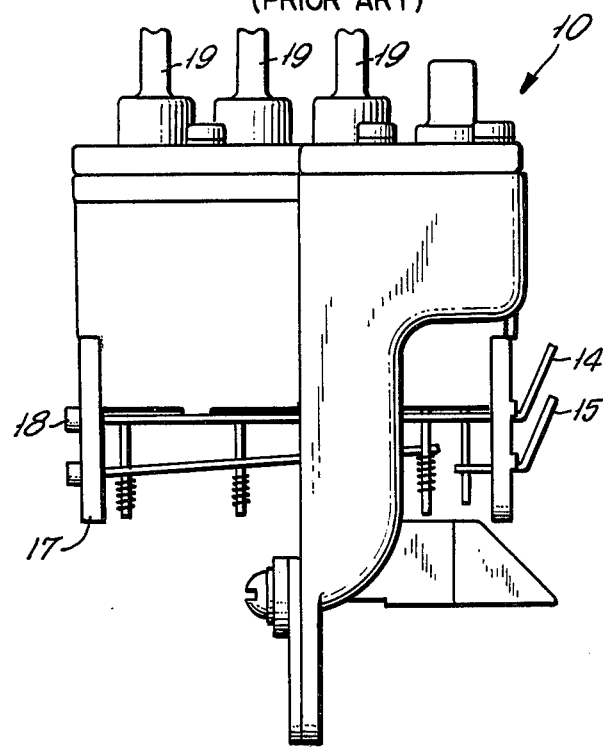
FIG. 1 is a top plan view of a known terminal block construction with which the disclosed inventive embodiment is used.
Figure 2:
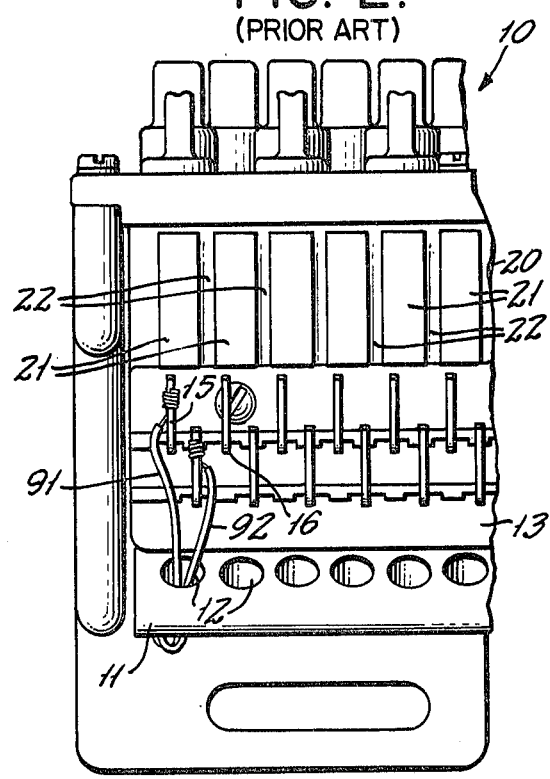
FIG. 2 is a bottom plan view thereof.
Figure 3:
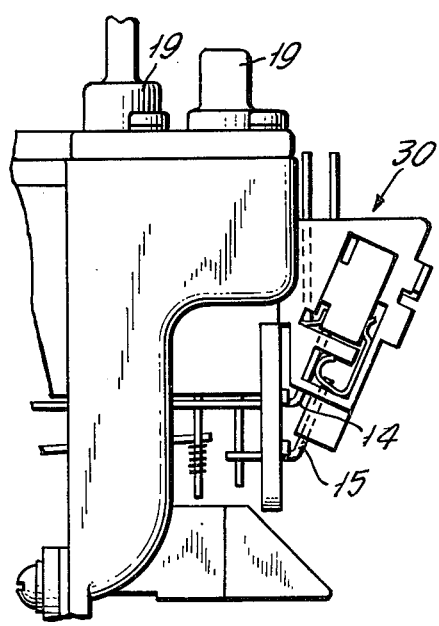
FIG. 3 is a side elevational view of an embodiment of the invention in installed condition.
Figure 4:
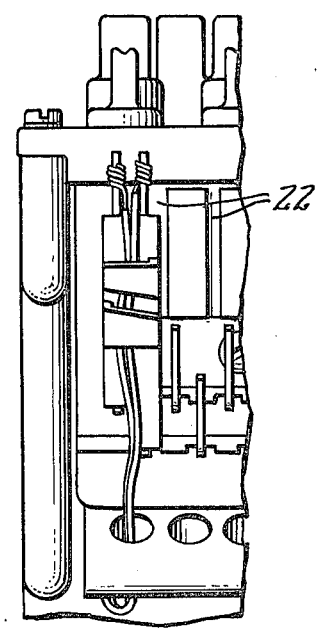
FIG. 4 is a bottom plan view of the embodiment in installed condition.

In accordance with the invention, the device, generally indicated by reference character 30, is specifically adapted for use in conjunction with a known connector block illustrated in FIGS. 1 and 2 in the drawings. This block, indicated by reference character 10 and known in the art as a Western Electric Type 300, includes a wire guide 11 having openings 12 leading to a plate 13, the outer surface of which positions angularly disposed wire wrap terminals 14 and 15 for the tip and ring circuits of individual subscriber pairs. A lower plate 17 provides corresponding appearances 18. For each pair, there are provided a pair of removable protector modules 19 of known type.

Adjacent the terminals 15 and 16 is an identification area 20 characterized in the provision of a plurality of rectangular projections 21 upon which desired indicia may be placed. Between the projections 21 are elongated interstices 22. As will more fully appear hereinafter, the projections 21 are used as mounting points for individual devices 30.

The device 30 will be understood from a consideration of the remaining figures in the drawing, and includes a molding housing element 31 enclosing an encapsulated bridge lifter circuit 32 which is formed as an encapsulated chip. The housing element 31 includes a main body 35 having a lower surface 36, a slanted upper surface 37, as well as first and second end portions 38 and 39.

Extending from the lower surface 36 are a pair of integrally molded flanges 40 and 41 adapted to surround individual projections 21 and lie in the interstices 22. As the flanges 40–41 are considerably shorter than the length of the projections 21, the housing element 31 may be slid along its own principal axis for adjustment purposes at the time of installation.

The upper surface 37 is provided with conductor retaining means 44 leading to a channel 45 on the end portion 39. At the end portion 38 there is provided a generally rectangular projection 47 having a bore 48 therein. A second bore 49 extends parallel thereto.

At the opposite end 39 a first surface 52 merges with a second surface 53, and is bordered by flanges 54 and 55 to guide conductors to first and second wire wrap pins 56 and 57 positioned in corresponding channels 58 and 59 in the housing element 31.

Referring to FIGS. 5 and 6 in the drawing, the housing element 31 also includes side surfaces 61 and 62 between which a rectangular through opening 64 extends. Communicating with the opening 64 is a laterally extending portion 65 extending to the inner end 66 of the pin 56. A second extension 67 communicates with an elongated channel 68 in turn communicating with a smaller rectangular recess 69 at an inner end of the first bore 48.

Extending from the surface 62 is a shallow recess 70 having a channel 71 communicating with a rectangular recess 72 opposite the inner end of the second bore 49.

The bridge lifter element 32 is known in the art, and is substantially similar to that illustrated in the disclosure in the abovementioned De Luca et al. patent. It includes an upper contact area 77 communicating with the pin 56 and a second upper contact area 78 communicating with the pin 57. Lower contact areas 81 and 82 communicate with conductive resilient members 63 and 64 at first ends 85 and 86, respectively and at second conductive ends 87 and 88, they communicate with the bores 48 and 49, respectively.

Installation upon a given subscriber pair is readily accomplished by merely disconnecting wire wrap terminals of conductors 91 and 92 already present, to permit engagement of the device 30 by first engaging the bores 48 and 49 upon the wire wrap terminals 15 and 16 relating to that subscriber pair. Upon engagement, the housing element 31 is gently pressed so that the flanges 40 and 41 engage the corresponding rectangular projection 21 of the same subscriber pair. Next, the conductors 91 and 92 are wire wrapped about the pins 56 and 57 to place the bridge lifter circuit element 32 in series with the subscriber pair. If the conductors 91 and 92 have been carefully removed, the same wrapped configuration may be employed permitting reinstallation without resort to a wire wrap tool.

We wish it to be understood that we do not consider the invention limited to the precise details of structure shown and set forth in this specification, for obvious modifications will occur to those skilled in the art to which the invention pertains.

We claim:

1. A bridge lifter module for use in conjunction with a telephone connector block having exposed wire wrap pins for each of the tip and ring circuits of an individual subscriber pair, and a generally elongated projection on said block for each pair adjacent said wire wrap pins, said module, upon installation, being placed in series with said tip and ring circuits, comprising: a molded insulative housing element, said housing element having means for detachably engaging said projection on said block; said housing having a first recess, and an encapsulated bridge lifter circuit element secured within said recess; said housing having second and third recesses, each communicating with said first recess, there being first and second bores in said housing communicating with an outer surface of said housing and said second and third recesses; first and second elongated contact members disposed respectively in said second and third recesses, and positioned adjacent the inner ends of said first and second bores to selectively establish electrical communication between said contact members and said wire wrap pins on said block upon engagement therewith, said contact members also electrically communicating with said bridge lifter circuit element; said housing having third and fourth bores extending from outer surfaces of said housing to said first recess, and first and second wire wrap pins extending through said first and second bores to establish communication with said bridge lifter circuit element; said module, upon installation, engaging said pair of wire wrap pins on said connector block relating to an individual subscriber circuit in said first and second bores, conductors which normally would be engaging said wire wrap pins being in lieu thereof interconnected to said first and second wire wrap pins on said module.

2. A bridge lifter module in accordance with claim 1, further characterized in said means on said housing for detachably engaging said block including provision for sliding adjustment to determine the degree of engagement of said module with said pair of pins on said block.

* * * * *